(12) United States Patent
Tkacik et al.

(10) Patent No.: US 9,075,674 B2
(45) Date of Patent: Jul. 7, 2015

(54) SYSTEMS WITH ADJUSTABLE SAMPLING PARAMETERS AND METHODS OF THEIR OPERATION

(71) Applicants: Thomas E. Tkacik, Phoenix, AZ (US); David G. Abdoo, Gilbert, AZ (US)

(72) Inventors: Thomas E. Tkacik, Phoenix, AZ (US); David G. Abdoo, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 279 days.

(21) Appl. No.: 13/712,070

(22) Filed: Dec. 12, 2012

(65) Prior Publication Data

US 2014/0164458 A1   Jun. 12, 2014

(51) Int. Cl.
*G06F 7/58* (2006.01)

(52) U.S. Cl.
CPC ........................ *G06F 7/58* (2013.01)

(58) Field of Classification Search
None
See application file for complete search history.

(56) References Cited

U.S. PATENT DOCUMENTS

| | | | |
|---|---|---|---|
| 6,667,665 B2 | 12/2003 | Janssen | |
| 6,862,605 B2 | 3/2005 | Wilber | |
| 7,047,262 B2 | 5/2006 | Hars | |
| 7,233,666 B2 | 6/2007 | Lee et al. | |
| 7,293,054 B2 | 11/2007 | Clements et al. | |
| 7,472,148 B2 | 12/2008 | Simon et al. | |
| 7,526,087 B2 | 4/2009 | Sun | |
| 8,015,224 B1 | 9/2011 | Chaichanavong et al. | |
| 8,130,950 B2 | 3/2012 | Dolgunov et al. | |
| 8,189,778 B2 | 5/2012 | Zhang | |
| 8,209,367 B2 | 6/2012 | Radja et al. | |
| 8,489,660 B2 * | 7/2013 | Herbert et al. | 708/251 |
| 2007/0116289 A1 | 5/2007 | Teglia et al. | |
| 2007/0230693 A1 | 10/2007 | Mueller et al. | |
| 2008/0258825 A1 * | 10/2008 | Gressel et al. | 331/78 |
| 2009/0204657 A1 | 8/2009 | Goettfert et al. | |
| 2009/0208014 A1 | 8/2009 | Betouin et al. | |
| 2009/0327381 A1 | 12/2009 | Morad | |
| 2010/0332574 A1 * | 12/2010 | Herbert et al. | 708/251 |
| 2011/0302232 A1 | 12/2011 | Vasyltsov et al. | |
| 2013/0024490 A1 * | 1/2013 | Stewart | 708/251 |
| 2013/0325918 A1 * | 12/2013 | Sherwood et al. | 708/250 |
| 2014/0136583 A1 * | 5/2014 | Hyde et al. | 708/250 |
| 2014/0164458 A1 * | 6/2014 | Tkacik et al. | 708/250 |
| 2014/0195576 A1 * | 7/2014 | Kaplan et al. | 708/250 |

OTHER PUBLICATIONS

E. Barker, et al., "Recommendation for Random Number Generation Using Deterministic Random Bit Generators", Computer Security Division, Information Technology Laboratory, NIST Special Publication 800-90A, U.S. Department of Commerce, National Institute of Standards and Technology, Jan. 2012, pp. 1-136.

(Continued)

*Primary Examiner* — David H Malzahn
(74) *Attorney, Agent, or Firm* — Sherry W. Schumm

(57) ABSTRACT

Embodiments include bitstring generators and methods of their operation. A sampling parameter of the bitstring generator is set to a current value, and values of one or more bits are then repeatedly sampled based on the current value of the sampling parameter. The repeated sampling results in a set of test bits, which is analyzed to determine a randomness measurement associated with the set of test bits. A determination is made whether the randomness measurement meets a criterion. If not, the current value of the sampling parameter is changed to a different value that corresponds to a lower probability of being able to correctly predict the values of the one or more bits produced by the bitstring generator. The steps of repeatedly sampling, analyzing the set of test bits, and determining whether the randomness measurement meets the criteria are then repeated.

20 Claims, 3 Drawing Sheets

(56) References Cited

OTHER PUBLICATIONS

E. Barker, et al., "Recommendation for the Entropy Sources Used for Random Bit Generation", Computer Security Division, Information Technology Laboratory, NIST Draft Special Publication 800-90B, U.S. Department of Commerce, National Institute of Standards and Technology, Aug. 2012, pp. 1-78.

* cited by examiner

US 9,075,674 B2

SYSTEMS WITH ADJUSTABLE SAMPLING PARAMETERS AND METHODS OF THEIR OPERATION

TECHNICAL FIELD

Embodiments of the subject matter described herein relate generally to methods and apparatus for generating pseudo-random bitstrings for use by random number generators.

BACKGROUND

Systems that perform cryptography typically require random or pseudo-random values for generating keys and for encrypting and decrypting data, among other things. Often, these random or pseudo-random values are generated based on random or pseudo-random bits produced by hardware- or software-implemented random bit generators (also referred to as random number generators). For example, one type of random bit generator, referred to as a non-deterministic random bit generator (NRBG), produces bits non-deterministically, where every bit output by the NRBG is based on an unpredictable physical process. When properly functioning, an NRBG produces bits that are considered to be Independent and Identically Distributed (IID), or truly random. Another type of random bit generator, referred to as a deterministic random bit generator (DRBG), produces output bits deterministically using a known algorithm (e.g., an algorithm specified or recommended by the National Institute of Standards and Technology (NIST), such as in NIST Special Publication 800-90 A, *Recommendation for Random Number Generation Using Deterministic Random Bit Generators*, January, 2012). Because the DRBG produces its output bits deterministically, its output bits are considered to be pseudo-random, rather than being IID or truly random. However, when a DRBG is properly instantiated and correctly operating, the pseudo-random bits that it produces are likely to be considered as acceptably unpredictable for most cryptographic applications.

To instantiate a DRBG, an "entropy bitstring" is first provided to the DRBG by an entropy source. Within the DRBG, the entropy bitstring is combined with other digital inputs (e.g., a nonce and/or a personalization string) to create a seed from which the DRBG creates an initial internal working state (or an "initial value"). The DRBG may then produce an indefinite number of pseudo-random output bits based on the initial internal working state. The DRBG also may initiate a counter for tracking the number of random value requests that the DRBG receives from external requesting modules (e.g., from cryptographic and/or key generation modules), and/or a counter for tracking the quantity of pseudo-random data produced by the DRBG since the instantiation was seeded (e.g., since the initial value was created). Occasionally, based on either or both of those counters, a new seed may be created from a new entropy input, and the DRBG may update the internal working state. Either way, once a seed is properly produced and an initial value is determined, the DRBG is ready to generate pseudo-random output bits for pseudo-random number generation.

To ensure that a seed used to instantiate a DRBG results in the production of acceptably unpredictable pseudo-random output bits, the source of the entropy bitstrings (the "entropy source") is relied upon to provide bitstrings that possesses an adequate amount of entropy. Designing such an entropy source is a difficult endeavor, and various resources are available to assist designers in this regard. For example, NIST has been instrumental in providing guidance for developing and testing entropy sources that are likely to consistently produce bitstrings with sufficient entropy for use by cryptographic applications (e.g., see NIST Draft Special Publication 800-90 B, *Recommendation for the Entropy Sources Used for Random Bit Generation*, August, 2012).

Typically, during the entire time that an entropy source is producing entropy bitstrings, the quality of the bitstrings' entropy is continuously analyzed using various failure mode tests and statistical tests. An entropy bitstring is considered to be of sufficient quality ("sufficiently random") when certain entropy-indicating characteristics of the analyzed bitstring meet pre-defined criteria. When the quality of an entropy bitstring is insufficient, the entropy bitstring is not provided to the DRBG. If an entropy source were consistently to produce entropy bitstrings of insufficient quality, the DRBG's seeding and re-seeding process may be stalled. As a result, system performance may suffer (e.g., by slowing or stalling the production of random numbers that are needed by consuming applications). Accordingly, entropy sources that consistently produce bitstrings of high quality are desired (e.g., entropy sources that rarely, if ever, fail entropy quality tests). However, extremely high-quality entropy sources tend to be slower than their lower-quality counterparts, and thus there is an inherent tradeoff between entropy bitstring quality and entropy bitstring production rate. With the ever present desire to increase system performance and speed, efficient and high-quality entropy sources and entropy bitstring generation methods are desired.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
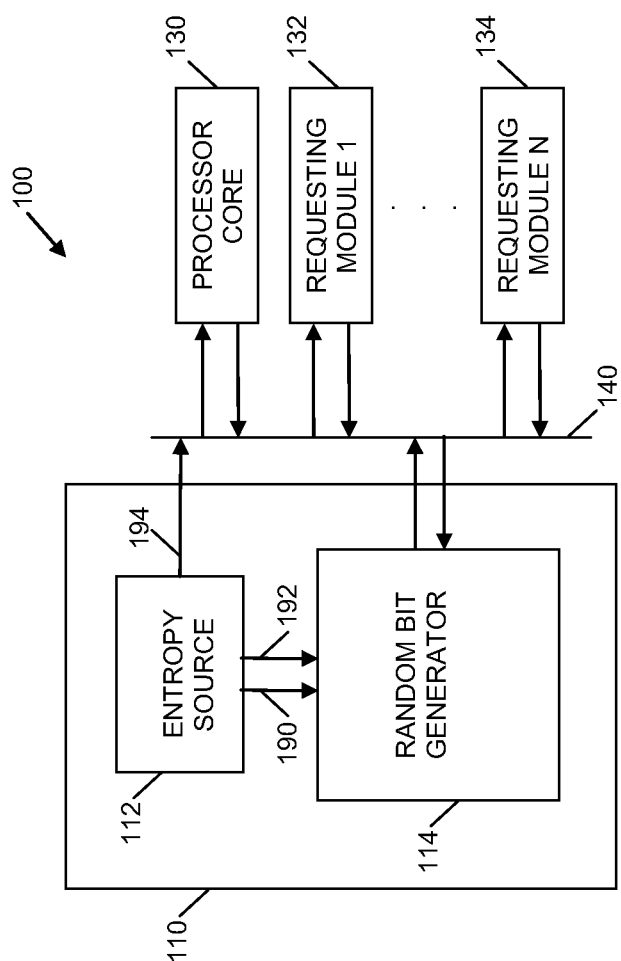
FIG. 1 is a simplified block diagram of an electronic system, in accordance with an example embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments include bitstring generators and methods for generating bitstrings. The bitstrings may be used as entropy bitstrings for use by random number generators (e.g., deterministic random number generators (DRBGs)) during seeding and re-seeding operations. For example, embodiments of bitstring generators and methods for generating bitstrings described herein may be included in electrical systems (e.g., computers, processing systems, and so on) that are capable of performing cryptographic applications. However, the various embodiments of bitstring generators and methods for generating bitstrings may be used in other types of systems and/or for other purposes, as well. Accordingly, the illustration and description of particular system and method embodiments included herein is not meant to limit the scope of the inventive subject matter to only those embodiments. Further, although the illustrations and description depict embodiments of bitstring generators and methods for generating bitstrings for consumption by a DRBG, the various embodiments may be used to generate bitstrings for non-deterministic random bit generators (NRBGs) or other consumers, as well.

In general, an embodiment of a bitstring generator is configured to sample bits from digital values that are derived from a received signal (e.g., from an oscillating signal). Sets of the sampled bits (referred to as "sets of test bits") are analyzed to determine whether or not each set of test bits is sufficiently random. The analysis may include one or multiple failure mode tests and/or statistical tests, each of which may produce a randomness measurement that indicates a level or quality of the randomness or unpredictability of the bits in the bitstring. Each randomness measurement may be assessed in light of a criterion specific to the associated test. When the randomness measurement compares favorably to the criteria (i.e., it meets the criteria), the set of sampled bits is considered to be of sufficient entropy, and at least a portion of the set of sampled bits may be used as an entropy bitstring. In contrast, when a randomness measurement does not compare favorably to the criteria (i.e., it does not meet the criteria), the set of sampled bits is considered to be of insufficient entropy, and the set of sampled bits may not be used as an entropy bitstring.

The likelihood of producing a set of test bits that has sufficient entropy is affected by several factors. For example, these factors include the unpredictability of the received signal from which the sampled digital signals are derived, and the technique used to sample bits from those digital values. According to an embodiment, a sampling technique is employed, which uses an adjustable sampling parameter. The adjustable sampling parameter includes an adjustable sampling interval (i.e., an interval of time between taking consecutive samples), in an embodiment. When the system determines that a set of test bits produced using a first sampling interval is characterized by insufficient entropy, the system may increase the sampling interval until the system determines that a new set of test bits is characterized by sufficient entropy. The system may then indicate (e.g., to a DRBG) that the set of test bits may be selected to provide an entropy bitstring.

As will be discussed in more detail below, other embodiments may include variations of the above-described features. For example, an adjustable sampling parameter may include a parameter other than a sampling interval, in some embodiments. In addition, the system may be configured to perform a pre-defined number of retry operations before adjusting a sampling parameter, in another embodiment. In addition, various types of signal sources may be used, and various types of digital values may be derived from those signal sources, in various embodiments. Other variations will be described below in more detail, and such variations are intended to be included within the scope of the inventive subject matter.

The various embodiments may be implemented in a system configured to protect data packets (e.g., Internet Protocol (IP) data packets) for communication between various system entities, for example. More specifically, in such a system, IP data packets to be communicated between participants in a communication session (e.g., pairs of hosts, gateways, networks, and so on) may be processed according to Internet Protocol Security (IPsec) protocols specified by the Internet Engineering Task Force (IETF). However, those of skill in the art would understand, based on the description herein, how to incorporate the various embodiments into other types of systems that may benefit from the advantages produced by the embodiments. Accordingly, incorporation of the various embodiments into other systems is intended to be within the scope of the inventive subject matter.

FIG. 1 is a simplified block diagram of an electronic system 100, in accordance with an example embodiment. System 100 includes random value production module 110, at least one processor core 130, and from 1 to N requesting modules 132, 134 (or "random value requesters"), where N may be any integer (e.g., any integer from 1 to 10 or more). Random value production module 110 is configured to produce random values in response to random value requests from processor core 130 and/or requesting modules 132, 134. For example, processor core 130, requesting modules 132, 134, and random value production module 110 may communicate over a bi-directional system bus 140 or other communication mechanism(s). During system operation, processor core 130 and/or any requesting module 132, 134 may send a random value request to random value production module 110 over the bus 140, and in response, the random value production module 110 may provide the requested random value to the processor core 130 or requesting module 132, 134 over the bus 140.

Requesting modules 132, 134 may include processor cores, cryptographic key generators (e.g., to generate Digital Signature Algorithm (DSA) keys, RSA keys, AES keys, and so on), cryptographic engines, protocol packet processors, padding modules, and various other types of modules configured to use random values for various purposes. In a particular embodiment, one or more of the requesting modules (e.g., requesting module 132) may be configured to perform IPsec packet processing (e.g., implementation of an IPsec protocol to perform packet authentication and encryption), and the requesting module 132 may send a request for an initialization vector (IV) to the random value production module 110 over bus 140. The random value production module 110 may then send the requesting module 132 an IV in response to the IV request. Besides IV requests, processor core 130 or requesting modules 132, 134 may send requests for other types of random values. For example, a requesting module (e.g., requesting module 134) may be a cryptographic key generator, and the requesting module 134 may send a request for a random value that may correspond to (or be used to create) a cryptographic key (e.g., a DSA private key, an AES key, and so on). Other types of requesting modules 132, 134 may send requests for other types of random values, as well.

Random value production module 110 includes at least one entropy source 112 and at least one random bit generator 114, in an embodiment. Although only a single entropy source 112 and a single random bit generator 114 are illustrated for simplicity, random value production module 110 may include multiple entropy sources and/or random bit generators or various types, as well.

According to an embodiment, random bit generator 114 is a deterministic random bit generator (DRBG) configured to generate random bits substantially according to an algorithm specified or recommended by the National Institute of Standards and Technology (NIST) (e.g., NIST Special Publication 800-90 A, *Recommendation for Random Number Generation Using Deterministic Random Bit Generators*, January, 2012). According to a more specific embodiment, random number generator 114 is a Hash_DRBG (i.e., a DRBG that utilizes a hash function to perform random number generation). In other embodiments, random number generator 114 may be a different type of random number generator (e.g., a non-deterministic random bit generator or a DRBG configured to generate random bits according to other algorithms, such as approved hash functions, block ciphers, number theoretic problems, and so on).

To instantiate the random bit generator 114, entropy source 112 is relied upon to provide an entropy bitstring to the random bit generator 114 (e.g., over data connection 192). Within the random bit generator 114, the entropy bitstring is combined with other digital inputs (e.g., a nonce and/or a personalization string) to create a seed from which the random bit generator 114 creates an initial internal working state or an "initial value". The random bit generator 114 may then produce an indefinite number of pseudo-random output bits based on the initial internal working state. The random bit generator 114 also may initiate a counter for tracking the number of random value requests that the random bit generator 114 receives from processor core 130 and/or requesting modules 132, 134, and/or a counter for tracking the quantity of pseudo-random data produced by the random bit generator 114 since the instantiation was seeded (e.g., since the initial value was created). Occasionally, based on either or both of those counters, a new seed may be created from a new entropy input, and the random bit generator 114 may update the internal working state.

Using embodiments of bitstring generation methods that are described in more detail in conjunction with FIGS. 2 and 3, below, entropy source 112 is configured to generate the entropy bitstrings (also referred to as "entropy inputs" or "seed bits") to be consumed by the random bit generator 114. According to an embodiment, entropy source 112 is designed to comply with recommendations and/or requirements specified by the National Institute of Standards and Technology (NIST) (e.g., in accordance with NIST Draft Special Publication 800-90 B, *Recommendation for the Entropy Sources Used for Random Bit Generation*, August, 2012). For example, entropy source 112 is designed to continuously analyze the randomness of the entropy bitstrings that it produces, in order to ensure that the entropy bitstrings are considered to be sufficiently random for use in seeding random bit generator 114. More specifically, during the entire time that entropy source 112 is producing entropy bitstrings, the quality of the bitstrings' entropy is continuously analyzed using various failure mode tests and/or statistical tests. An entropy bitstring is considered to be of sufficient quality (or sufficiently random) when certain entropy-indicating characteristics of the analyzed bitstring meet pre-defined criteria.

When the entropy source 112 has generated an entropy bitstring that is considered to be sufficiently random, entropy source 112 may provide a "data ready" signal to the random bit generator 114 over a signaling connection 190, and may allow the entropy bitstring to be accessed by the random bit generator 114 over a data connection 192. When the entropy source 112 has generated one or more entropy bitstrings that are not considered to be sufficiently random, entropy source 112 may refrain from producing the data ready signal and may not enable the entropy bitstring(s) to be accessed by the random bit generator 114. Entropy source 112 instead may produce a failure-indicating signal destined for processor core 130 on a signaling connection 194 that is coupled to the system bus 140 or that is coupled directly to the processor core 130 or another error handling module.

According to an embodiment, in order to increase a likelihood that the random number generator 114 or the system 100 will not be stalled by an inability of the entropy source 112 to produce sufficiently random entropy bitstrings at a fast enough rate, the entropy source 112 employs a sampling technique, which uses an adjustable sampling parameter. For example, according to an embodiment, the adjustable sampling parameter includes an adjustable sampling interval (i.e., an interval of time between taking consecutive samples), although the adjustable sampling parameter may include a different type of value, as well. This and other embodiments are illustrated and described in more detail in conjunction with FIGS. 2 and 3.

Figure 2:
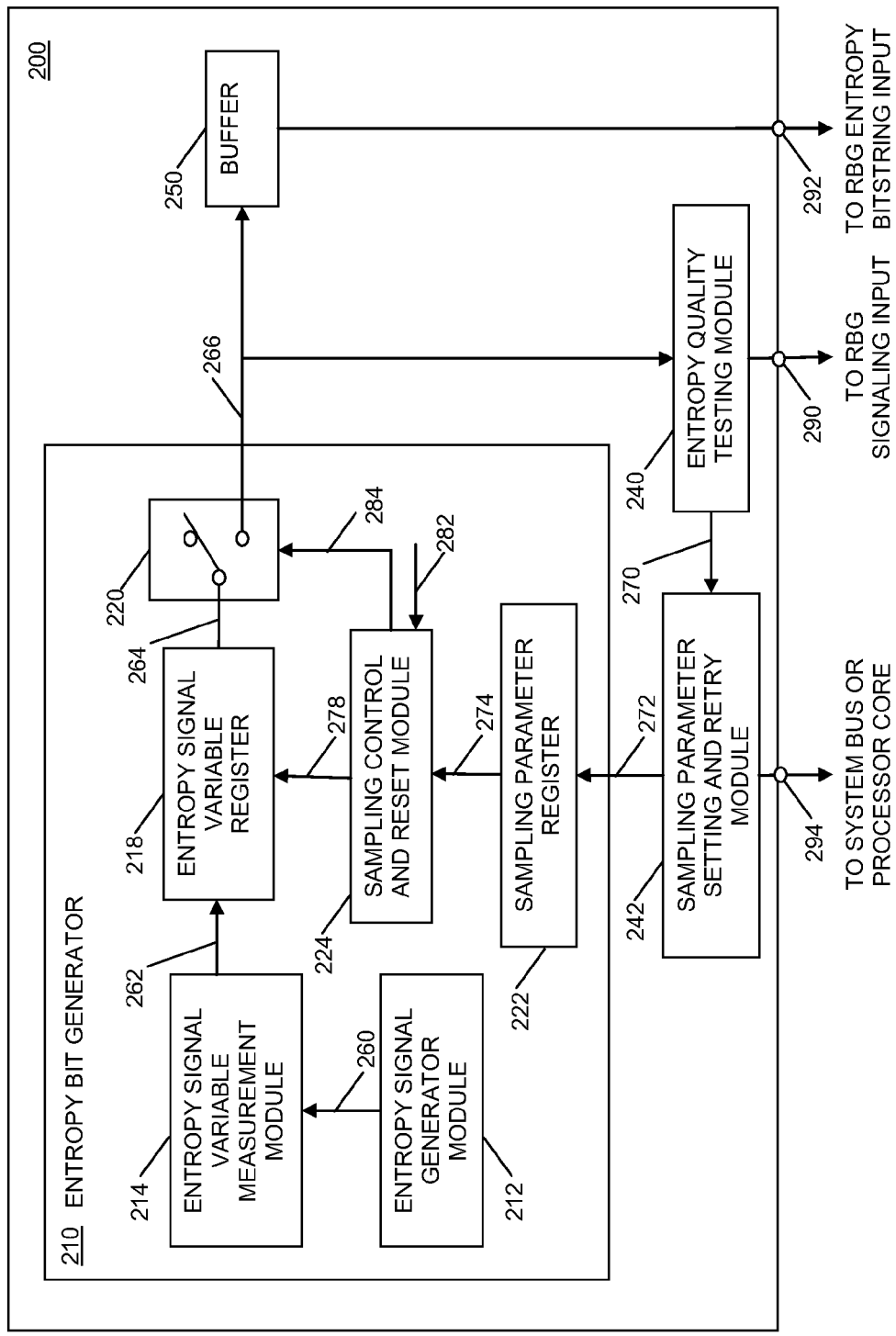
FIG. 2 is a simplified block diagram of a pseudo-random bitstring generator, in accordance with an example embodiment.

FIG. 2 is a simplified block diagram of a pseudo-random bitstring generator 200, in accordance with an example embodiment. Bitstring generator 200 includes an entropy bit generator 210, an entropy quality testing module 240, a sampling parameter setting and retry module 242, and a buffer 250, in an embodiment. As will be described in more detail below, entropy bit generator 210 is configured to produce a series of test bits 266 by repeatedly sampling values derived from an entropy signal 260 produced by an entropy signal generator module 212. The series of test bits 266 are simultaneously stored in buffer 250 and provided to the entropy quality testing module 240, in an embodiment. In an alternate embodiment, the entropy quality testing module 240 may access the test bits from the buffer 250, rather than receiving them directly from the entropy bit generator 210.

The entropy quality testing module 240 is configured to perform one or more failure mode tests and/or one or more statistical analysis tests on each of multiple sets of test bits. According to an embodiment, each set of test bits includes a pre-defined number of bits 266 produced by the entropy bit generator 210. For example, each set of test bits may be selected for analysis by applying a window having a pre-defined width (corresponding to the pre-defined number of bits) to the test bits 266 produced by the entropy bit generator 210. For example, according to various embodiments, the window may have a width in a range of about 16 bits to about 65,536 bits. In still other embodiments, the window may be narrower or wider than the above-given range.

According to an embodiment, each of the failure mode tests and/or statistical analysis tests performed by the entropy quality testing module 240 determines one or more randomness measurements associated with the set of test bits, and each of the tests specifies one or more criteria that the one or more randomness measurements should meet in order to consider the set of test bits as sufficiently random. For example, a criterion associated with a particular test may simply be a pass/fail criterion (e.g., a set of test bits may meet the criteria if the set of test bits passes the test). Alternatively, a criterion associated with a particular test may include a threshold above or below which a calculated randomness measurement must fall in order for a set of test bits to be considered sufficiently random. Alternatively, a criterion associated with a particular test may include a range within which a calculated randomness measurement must fall in order for a set of test bits to be considered sufficiently random. Other types of criteria may be used, as well.

Failure mode tests performed by the entropy quality testing module 240 may detect certain failure modes (e.g., modes in which the entropy bit generator 210 is consistently producing insufficiently random bitstrings). The randomness measurements determined by the failure mode tests may simply indicate whether or not a set of test bits passed or failed the test. The failure mode tests may include, for example, a repetition count test (or a "stuck bit" test), an adaptive proportion test, and/or one or more other tests that detect the same failure conditions reliably (e.g., tests that demonstrate equivalent functionality as the repetition count test and the adaptive proportion test). Statistical analysis tests performed by the entropy quality testing module 240 may produce values that quantify the randomness of the bitstrings in various ways. The randomness measurements determined by these tests each indicate a quality of randomness. For example, the statistical analysis tests may include a Chi-Square test, an independence test for non-binary data, a test for goodness of fit for non-binary data, an independence test for binary data, a test for stability of distribution in binary data, and/or one or more other statistical analysis tests. Example descriptions of the above-mentioned failure mode tests and statistical analysis tests may be found, for example, in NIST Draft Special Publication 800-90 B, *Recommendation for the Entropy Sources Used for Random Bit Generation*, August, 2012.

When a set of test bits passes each of the tests performed by the entropy quality testing module 240, the entropy quality testing module 240 may provide a "data ready" signal on a signaling output 290, where the signal indicates that a bitstring of sufficiently random bits (e.g., an entropy bitstring) is available for access. In addition, the bitstring generator 200 may make all or a portion of the set of test bits available to be read from buffer 250 via a data output 292. The signaling output 290 may be connected to a signaling input of the random number generator through a signaling connection (e.g., signaling connection 190, FIG. 1), and the data output 292 may be connected to an entropy bitstring input of the random number generator through a data connection (e.g., data connection 192, FIG. 1). When a set of test bits does not pass each of the tests performed by the entropy quality testing module 240, the entropy quality testing module 240 may refrain from providing the data ready signal on the signaling output 290, and/or may render the test bits in buffer 250 inaccessible through the data output 292.

As mentioned previously, test bits produced by the entropy bit generator 210 may be both provided to the entropy quality testing module 240 and stored in buffer 250. According to an embodiment, each set of test bits includes a significantly greater number of bits than the size of an entropy bitstring. Accordingly, although buffer 250 may be of sufficient size to store an entire set of test bits (or multiple sets of test bits), buffer 250 alternatively may be smaller, as well. According to an embodiment, an entropy bitstring output from the buffer 250 to data output 292 may include a number of the most recently stored (sampled) bits that corresponds to the size of an entropy bitstring. For example, if a set of test bits were to include 2500 bits and an entropy bitstring were to include only 384 bits, the most recently stored 384 bits (e.g., the last 384 bits of the set of test bits) may be output from the buffer 250 to data output 292 for use by the random number generator as an entropy bitstring. In such an embodiment, for example, buffer 250 may be a First-In, First-Out (FIFO) buffer configured to retain only a certain number of the most recently produced test bits (e.g., a FIFO buffer with as few as 384 bit storage locations).

According to an embodiment, when a set of test bits does not pass each of the tests performed by the entropy quality testing module 240, the entropy quality testing module 240 may provide a signal 270 to the sampling parameter setting and retry module 242, which indicates the failure. As will be described in more detail below, in response to the failure indication, the sampling parameter setting and retry module 242 may change the value of a sampling parameter that is used by the entropy bit generator 210 in generating the test bits. According to an embodiment, prior to changing the value of the sampling parameter, the sampling parameter setting and retry module 242 may first initiate a pre-defined number of test bit generation retry procedures. In other words, the sampling parameter and retry module 242 may allow the entropy bit generator 210 to produce one or more new sets of test bits without changing the sampling parameter, in order to allow the system to attempt to produce a set of test bits that will pass the tests conducted by the entropy quality testing module 240. If the entropy bit generator 210 fails to produce a set of test bits that passes the tests during the pre-defined number of retry procedures, the sampling parameter and retry module 242 then changes the value of the sampling parameter. In an alternate embodiment, the system 100 may not allow retry procedures to be performed (e.g., the sampling parameter setting and retry module 242 is simply a sampling parameter setting module).

The entropy bit generator 210 will now be discussed in more detail. According to an embodiment, the entropy bit generator 210 includes an entropy signal generator module 212, an entropy signal variable measurement module 214, an entropy signal variable register 218, a sampling module 220, a sampling parameter register 222, and a sampling control and reset module 224.

The entropy signal generator module 212 produces an entropy signal 260. According to an embodiment, the entropy signal 260 is an oscillating signal. For example, the oscillating signal may be a square wave, a sine wave, a triangular wave, a ramp signal, or another type of oscillating signal. According to a particular embodiment, the entropy signal generator module 212 includes a ring oscillator, which is configured to produce a square wave. In order to provide a sufficient quality of entropy, the oscillator desirably is a relatively "sloppy" oscillator, for which the level of its output signal (e.g., high or low voltage) and/or the frequency of the output signal becomes less predictable the longer the oscillator runs. For example, the oscillator may be particularly sensitive to thermal noise, noise produced by other, nearby system components, and so on.

The entropy signal variable measurement module 214 receives the entropy signal 260 from the entropy signal generator module 212. The entropy signal variable measurement module 214 is configured to measure a variable associated with the entropy signal 260, and to store a value 262 of the variable in the entropy signal variable register 218. For example, in an embodiment, the entropy signal variable measurement module 214 is configured to count signal transitions that occur in the entropy signal 260 over a period of time by incrementing a signal transition count that is stored in the entropy signal variable register 218. More specifically, the entropy signal variable measurement module 214 and the entropy signal variable register 218 are configured to count a number of signal transitions that occur in the entropy signal during each of multiple sampling intervals. As will be described in more detail below, the count stored in the entropy signal variable register 218 may be initialized to an initial value (e.g., 0) at the beginning of a sampling interval, and the entropy signal variable measurement module 214 may increment the count each time it detects a signal transition. In various embodiments, the entropy signal variable measurement module 214 may detect and count only low-to-high signal transitions, only high-to-low signal transitions, or both low-to-high and high-to-low signal transitions.

In various alternate embodiments, the entropy signal variable measurement module 214 may measure other variables associated with the entropy signal 260, and may store values 262 representing those other variables in the entropy signal variable register 218. For example, the entropy signal variable measurement module 214 may include an analog-to-digital converter, which samples and digitizes amplitudes of the entropy signal 260 during the sampling interval, and which stores digital values 262 representing the amplitudes in the entropy signal variable register 218. Alternatively, the entropy signal variable measurement module 214 may store values 262 representing measured frequencies of the entropy signal 260, measured phases of the entropy signal 260, or other measured values 262 representing some variable of the entropy signal 260.

According to an embodiment, the entropy signal variable register 218 is a multiple bit register, with bits arranged from a least significant bit to a most significant bit. Alternatively, the entropy signal variable register 218 could be a single bit register. The entropy signal variable register 218 is configured to store a range of values from zero to a maximum value that can be represented by the number of bits that the register 218 includes. For example, if the entropy signal variable register 218 is an eight-bit register, the entropy signal variable register 218 is configured to store values ranging from 0 (binary 0000 0000) to 255 (binary 1111 1111). According to an embodiment, entropy signal variable register 218 has a number of bits in a range from 4 bits to 64 bits, although entropy signal variable register 218 may have more or fewer bits, as well.

Sampling module 220 includes one or more switches (e.g., at least one switch for each bit of the entropy signal variable register 218 that is sampled), which are configured, when closed, to output a value 264 of each bit sampled from the entropy signal variable register 218 as a test bit 266. For example, when only one bit (e.g., the least significant bit) of the entropy signal variable register 218 is sampled, sampling module 220 theoretically may include a single switch configured to convey the value 264 of the sampled bit as a test bit 266. Conversely, when multiple bits (e.g., two or more of the least significant bits) are sampled, sampling module 220 includes multiple switches configured to convey the values 264 of the sampled bits as test bits 266.

Sampling control and reset module 224 produces one or more control signals 284 to sampling module 220, which cause the sampling module 220 to sample the one or more bits of the entropy signal variable register 218 at various times. For example, sampling control and reset module 224 may cause the sampling module 220 to sample the one or more bits upon the expiration of each sampling interval. For example, at the end of a sampling interval, the entropy signal variable register 218 may have stored within it a digital value representing a cumulative count of the number of transitions that have occurred in the entropy signal 260 during the sampling interval. When the sampling module 220 samples one or more bits of the entropy signal variable register 218, the sampling module 220 passes the values 264 of the one or more bits out as test bits 266. According to an embodiment, sampling control and reset module 224 also produces a reset signal or stores a reset value 278 in the entropy signal variable register 218 at the end of each sampling interval. For example, in an embodiment in which the entropy signal variable register 218 is used to store a cumulative count of the number of transitions that have occurred in the entropy signal 260 during the sampling interval, the value in the entropy signal variable register 218 may be reset to 0 at the end of each sampling interval.

According to an embodiment, sampling control and reset module 224 causes the sampling module 220 to sample the one or more bits at times that are determined by a current value 274 of a sampling parameter stored in sampling parameter register 222. For example, the sampling parameter may be a time related parameter, such as a sampling time interval or delay, a number of clock cycles, a number of clock signal transitions (e.g., low-to-high, high-to-low, or both), and so on. Accordingly, the value of the sampling parameter may define a time period associated with each sampling interval, or a number of clock cycles that define each sampling interval, respectively. In either case, a relatively small value of the sampling parameter corresponds to a relatively short sampling interval, and a relatively large value of the sampling interval corresponds to a relatively long sampling interval. Because the entropy signal generator module 212 is designed to produce an entropy signal 260 having values that are less predictable over time, a relatively long sampling interval is more likely to result in sampled test bits 266 having less predictable values, in an embodiment. In other embodiments, the sampling parameter may specify some other value that is likely to affect the predictability of sampled values (e.g., a number of bits in each amplitude sample, a voltage range, a current adjustment, or some other parameter that may affect the predictability of the values of sampled test bits 266).

According to an embodiment, sampling control and reset module 224 is configured to read the current value 274 stored in the sampling parameter register 222 at the beginning of each sampling interval, and to determine when the sampling interval has expired based on the current value 274 and a received clock signal 282. For example, when the current value 274 indicates a duration of the sampling interval, the sampling control and reset module 224 determines that the sampling interval has expired when a number of clock signal cycles have been detected that correspond to duration of the sampling interval. Accordingly, the current value 274 of a sampling parameter stored in the sampling parameter register 222 defines the duration of the sampling interval.

According to an embodiment, the sampling parameter setting and retry module 242 stores a sampling parameter value 272 in the sampling parameter register 222. According to an embodiment, the sampling parameter setting and retry module 242 initially stores an initial or default value 272 in the sampling parameter register 222, where the initial value 272 defines an initial sampling interval duration. However, when the test bits 266 produced by the entropy bit generator 210 during a sampling interval fail to meet criteria of one or more of the tests performed by the entropy quality testing module 240 (as indicated via signal 270), the sampling parameter setting and retry module 242 may change the current value 274 of the sampling parameter by storing a new sampling parameter value 272 in the sampling parameter register 222. According to an embodiment, and as discussed previously, the sampling parameter setting and retry module 242 may first perform a pre-defined number of retry operations prior to changing the current value 274 of the sampling parameter. Alternatively, the sampling parameter setting and retry module 242 may change the current value 274 of the sampling parameter without performing any retry operations.

According to an embodiment, the sampling parameter setting and retry module 242 may change the current value 274 of the sampling parameter by storing a new sampling parameter value 272 that corresponds to a lower probability of being able to correctly predict the values of the test bits 266 produced by the entropy bit generator 210 at the end of a sampling interval. For example, the sampling parameter setting and retry module 242 may store a new sampling parameter value 272 that results in an increase in the duration of the sampling interval (e.g., the duration of the sampling interval may be increased by a delta value or the sampling interval may be multiplied by a factor (e.g., doubled or tripled)). Since the entropy signal generator module 212 produces an entropy signal 260 having values that are less predictable as time goes on, in an embodiment, the values 264 of the bits sampled at the end of a longer sampling interval are less predictable than the values 264 of the bits sampled at the end of a shorter sampling interval. Accordingly, by enabling the sampling parameter to be changed in response to a detected test failure, the entropy bit generator 210 may be controlled to produce test bits 266 having higher quality entropy.

According to an embodiment, the sampling parameter may be modified multiple times before a current value 274 of the sampling parameter results in the production of test bits 266 characterized by sufficient randomness. Accordingly, in an embodiment, until the randomness measurements determined by the entropy quality testing module 240 meet all applicable test criteria, the current value 274 of the sampling parameter may be repeatedly changed, and new sets of test bits may be produced and analyzed. In an alternate embodiment, the system may limit the number of times that the sampling parameter may be changed to a pre-defined maximum number. For example, the sampling parameter and retry module 242 may maintain a count of the number of times that it has changed the sampling parameter. When the system has failed to produce a set of test bits 266 that meet all applicable test criteria after the sampling parameter and retry module 242 has changed the sampling parameter the pre-defined maximum number of times, the sampling parameter setting and retry module 242 may produce a failure-indicating signal on a signaling output 294, which is intended to notify the processor core (e.g., processor core 130, FIG. 1) or another module of the failure condition. In other alternate embodiments, the sampling parameter and retry module 242 may produce a failure-indicating signal when it determines that the next new sampling parameter value that it calculates either exceeds a maximum value, exceeds a threshold, or would cause the sampling parameter register 222 to overflow. In still other alternate embodiments, the failure-indicating signal may be produced on the signaling output 294 at some other time or in response to some other event. Assuming that the sampling parameter has not been changed a number of times that has invoked a failure indication, the current value 272 of the sampling parameter may be re-initialized to the initial value by the sampling parameter setting and retry module 242 once an acceptably random set of test bits 266 has been produced, in an embodiment.

Figure 3:
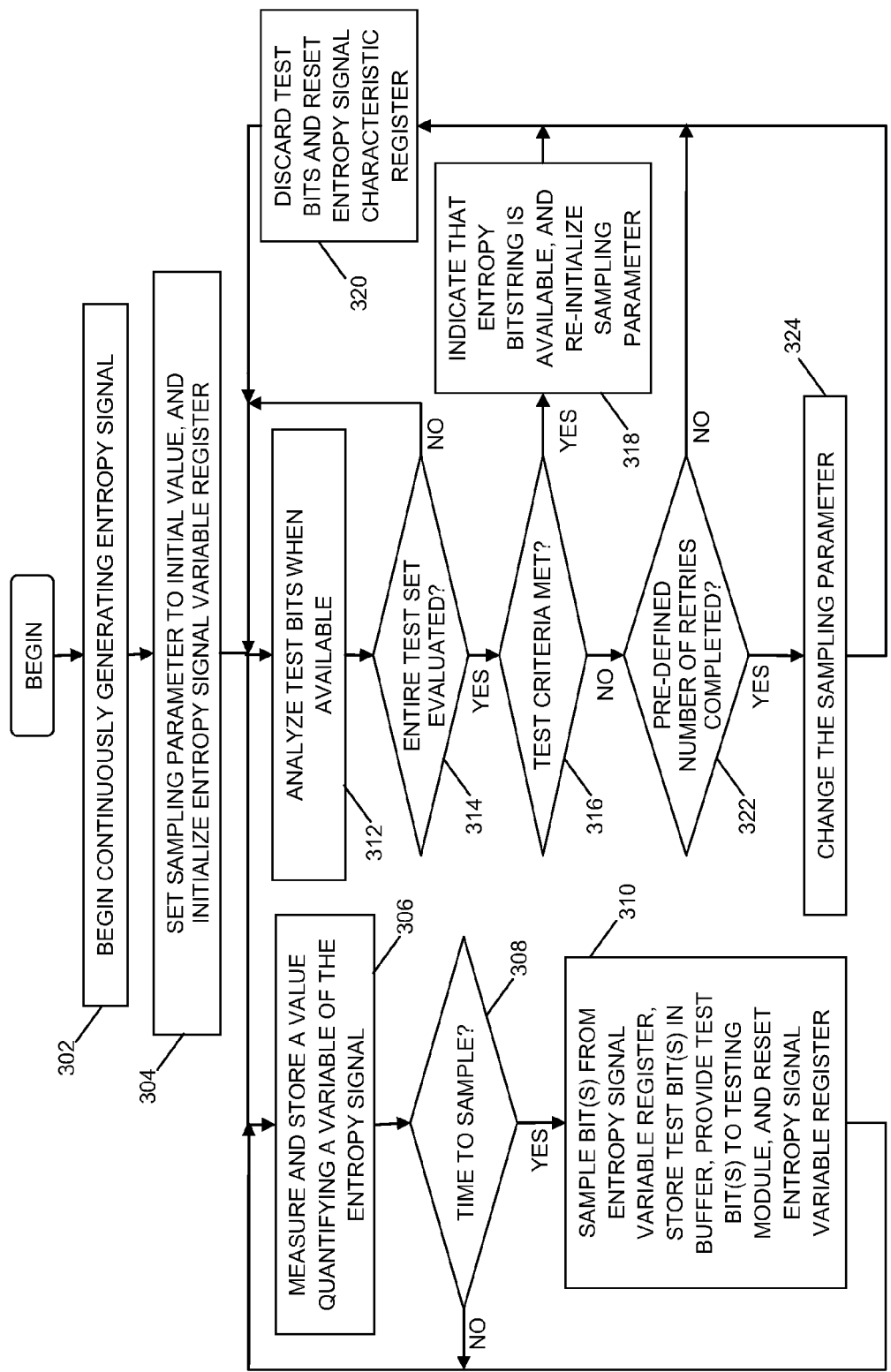
FIG. 3 is a flowchart of a method for generating a pseudo-random bitstring, in accordance with an example embodiment.

FIG. 3 is a flowchart of a method for generating a pseudo-random bitstring, in accordance with an example embodiment. For example, the method may be performed by a bitstring generator, such as the bitstring generator 200 discussed in detail in conjunction with FIG. 2. Alternate embodiments of the method discussed above in conjunction with the description of FIG. 2 are intended to apply similarly to the embodiment of the method depicted in FIG. 3 and discussed below.

The method may begin, in block 302, by beginning to continuously generate an entropy signal. For example, an entropy signal generator module (e.g., entropy signal generator module 212, FIG. 2) may be invoked to begin producing an entropy signal (e.g., entropy signal 260, FIG. 2). The entropy signal may be an oscillating signal, for example.

In block 304, an initialization procedure may be performed by setting the current value of a sampling parameter to an initial value. For example, a sampling parameter setting module (e.g., sampling parameter setting and retry module 242, FIG. 2) may store an initial sampling parameter value (e.g., sampling parameter value 272) into a sampling parameter register (e.g., sampling parameter register 222, FIG. 2). As discussed previously, the current value of the sampling parameter may define the duration of a sampling interval.

The initialization procedure also may include initializing a value in an entropy signal variable register (e.g., entropy signal variable register 218, FIG. 2). For example, as discussed previously, the entropy signal variable register may be used to store the value of a variable associated with the entropy signal, such as a count of elapsed entropy signal transitions, a frequency of the entropy signal, a phase of the entropy signal, an amplitude of the entropy signal, and so on. According to an embodiment, the value stored within the entropy signal variable register may be initialized to 0.

Once the system is initialized, entropy bit generation and entropy bit testing processes may then be performed in parallel. More specifically, in the embodiment illustrated in FIG. 3, an entropy bit generation process represented by blocks 306-310 may be performed in parallel with an entropy bit testing process represented by blocks 312-324.

The entropy bit generation process may be performed primarily by an entropy bit generator (e.g., entropy bit generator 210, FIG. 2), for example. According to an embodiment, the entropy generation process includes measuring and storing a value that quantifies a variable of the entropy signal, in block 306. For example, the value quantifying a variable of the entropy signal may be measured and stored by a measurement module (e.g., entropy signal variable measurement module 214, FIG. 2). As discussed above, the measured variable may include a count of elapsed entropy signal transitions, a frequency of the entropy signal, a phase of the entropy signal, an amplitude of the entropy signal, or some other variable.

In block 308, a determination is made whether or not it is time to sample the stored entropy signal variable value. According to an embodiment, the determination is made by a sampling module (e.g., sampling control and reset module 224, FIG. 2) based on the current value of the sampling parameter (e.g., the current value 274 of the sampling parameter stored in the sampling parameter register 222, FIG. 2). For example, the current value of the sampling parameter may specify the duration of a sampling interval, and the sampling module may determine that it is time to sample the stored entropy signal variable value based on whether or not the current sampling interval has expired. When a determination is made that it is not time to sample the stored entropy signal variable, the entropy signal variable may continue to be measured and stored (e.g., updated).

When a determination is made that it is time to sample the stored entropy signal variable, the current values of one or more bits may be sampled from the entropy signal variable register, in block 310. For example, as discussed previously the values of one or more of the least significant bits of the entropy signal variable register may be sampled and provided as test bits. The test bits (e.g., test bits 266, FIG. 2) may be stored in a buffer (e.g., buffer 250, FIG. 2), and provided to a testing module (e.g., entropy quality testing module 240, FIG. 2). In addition, to prepare the system for the next sampling interval, a value in the entropy signal variable register may be reset (e.g., a value of 0 may be stored in entropy signal variable register 218 by the sampling control and reset module 224). The entropy bit generation process may then iterate as shown, where each iteration of blocks 316-310 corresponds to a new sampling interval.

The entropy bit testing process may be performed primarily by entropy quality testing and parameter setting modules (e.g., entropy quality testing module 240 and sampling parameter setting and retry module 242, FIG. 2). According to an embodiment, the testing procedure may commence, in block 312, upon the receipt of a sufficient quantity of test bits to begin performing one or more failure mode tests and/or statistical analysis tests, each indicative of a quality of entropy or randomness of the test bits. Alternatively, the testing process may wait to commence until an entire set of test bits has been received by the testing module.

The test bits may be analyzed once they are available (e.g., once they are provided by entropy bit generator 210 to the entropy quality testing module 240). As discussed previously, the test bits may be analyzed by performing one or more failure mode tests or statistical analysis tests on the set of test bits. The testing process continues until the entire set of test bits has been analyzed, as indicated by decision block 314. The performance of each test may result in the production of a randomness measurement. In block 316, each of the randomness measurements are evaluated against a criterion specific for its associated test, and a determination is made whether or not each randomness measurement meets the criteria. When the randomness measurements meet their associated test criteria, the system may provide an indication (e.g., to a random bit generator 114, FIG. 1) that an entropy bitstring is available, in block 318. In addition, if the sampling parameter had been changed from its initial value (e.g., in block 324, discussed below), the sampling parameter may be re-initialized to its initial value. In block 320, the testing module may then discard (or drop) the previously-generated test bits, and the entropy signal variable register may be reset (or re-initialized). The method may then iterate as shown.

Referring back to block 316, when a determination is made that one or more randomness measurements do not meet their associated test criteria, the system optionally may perform a pre-defined number of retries in an attempt to obtain a set of sufficiently random test bits using the current sampling parameter. When the pre-defined number of retries has not been completed, as indicated by decision block 322, the previously-generated test bits may be discarded, in block 320, and the entropy signal variable register may be reset. The method may then iterate, as shown, until a generated set of test bits either meets all randomness criteria or the pre-defined number of retries has been completed. In an alternate embodiment, the system may not support the retry procedure.

After determining that the most recently generated set of test bits has failed one or more failure mode tests and/or statistical analysis tests, the sampling parameter is changed, in block 324, to a value that is more likely to result in a set of test bits that will pass all failure mode tests and statistical analysis tests. For example, the sample parameter setting module (e.g., sample parameter setting module 242, FIG. 2) may store a new sampling parameter value in the sampling parameter register (e.g., sampling parameter register 222, FIG. 2). As discussed previously, the new sampling parameter register may correspond to a longer sampling interval. The previously-generated test bits are then discarded, in block 320, and the entropy signal value register is reset. The method then iterates, as shown, until the system either produces a set of test bits that meets all test criteria, or the number of times that the system has changed the sampling parameter has invoked production of a failure indication (e.g., the system has performed a pre-defined maximum number of sampling parameter changes without success, or a next new sampling parameter value would exceed a maximum value, exceed a threshold, or cause the sampling parameter register to overflow).

An embodiment of a method for generating a bitstring includes setting a current value of a sampling parameter to an initial value, and producing a set of test bits by repeatedly sampling values of one or more bits, where the values are derived from a received signal. Each sampling process is performed upon an expiration of a sampling interval that corresponds to the current value of the sampling parameter. The method further includes analyzing the set of test bits to determine a randomness measurement associated with the set of test bits, and determining whether the randomness measurement meets a criterion. When the randomness measurement does not meet the criteria, the current value of the sampling parameter is changed to a different value that corresponds to an increase in the sampling interval. The steps of producing the set of test bits, analyzing the set of test bits, and determining whether the randomness measurement meets the criteria are then repeated.

An embodiment of a method for a bitstring generator to generate a bitstring includes setting a sampling parameter to a current value, where different values of the sampling parameter are associated with different probabilities of being able to correctly predict values, derived from a received signal, of one or more bits produced by the bitstring generator. The values of the one or more bits are repeatedly sampled, and each sampling process is performed based on the current value of the sampling parameter. The repeated sampling results in a set of test bits, and the set of test bits is analyzed to determine a randomness measurement associated with the set of test bits. The method further includes determining whether the randomness measurement meets a criterion. When the randomness measurement does not meet the criteria, the current value of the sampling parameter is changed to a different value that corresponds to a lower probability of being able to correctly predict the values of the one or more bits produced by the bitstring generator. The steps of repeatedly sampling, analyzing the set of test bits, and determining whether the randomness measurement meets the criteria are then repeated.

An embodiment of a system includes a sampling parameter register, a sampling parameter setting module, a sampling control module, and a testing module. The sampling parameter register is configured to retain a current value of a sampling parameter. The sampling parameter setting module is configured to store the current value of the sampling parameter in the sampling parameter register. The sampling control module is configured to produce a set of test bits by repeatedly causing values of one or more bits to be sampled. The values are derived from a received signal. The sampling control module causes each sampling process to be performed upon an expiration of a sampling interval that corresponds to the current value of the sampling parameter. The testing module is configured to analyze the set of test bits to determine a randomness measurement associated with the set of test bits, and to determine whether the randomness measurement meets a criterion. The sampling parameter setting module is further configured to change the current value of the sampling parameter to a different value that corresponds to an increase in the sampling interval when the randomness measurement does not meet the criteria.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for generating a bitstring, the method comprising the steps of:
   setting a current value of a sampling parameter to an initial value;

producing a set of test bits by repeatedly sampling values of one or more bits, wherein the values are derived from a received signal, and wherein each sampling process is performed upon an expiration of a sampling interval that corresponds to the current value of the sampling parameter;

analyzing the set of test bits to determine a randomness measurement associated with the set of test bits;

determining whether the randomness measurement meets a criterion;

when the randomness measurement does not meet the criteria, changing the current value of the sampling parameter to a different value that corresponds to an increase in the sampling interval; and repeating the steps of producing the set of test bits, analyzing the set of test bits, and determining whether the randomness measurement meets the criteria.

2. The method of claim 1, wherein the sampling parameter comprises a number of transitions of a clock signal, and wherein:

setting the current value comprises setting the current value to a first number of clock cycle transitions that corresponds to a sampling interval of a first length of time; and changing the current value comprises setting the current value to a second number of clock cycle transitions that is larger than the first number of clock cycle transitions, wherein the second number of transitions corresponds to a sampling interval of a second length of time that is larger than the first length of time.

3. The method of claim 1, wherein the received signal is an oscillating signal, and wherein producing the set of test bits comprises deriving the values from the received signal by:

measuring a variable associated with the oscillating signal; and storing a measurement of the variable in a register, wherein the one or more bits whose values are sampled include one or more bits of the register.

4. The method of claim 3, wherein the variable of the oscillating signal is selected from a number of transitions of the oscillating signal that occur during the sampling interval, an amplitude of the oscillating signal, a frequency of the oscillating signal, and a phase of the oscillating signal.

5. The method of claim 3, wherein the oscillating signal is a square wave produced by an oscillator, and the oscillator is characterized by producing a signal having a value that becomes less predictable over time.

6. The method of claim 3, wherein the variable of the oscillating signal is a number of transitions of the oscillating signal that occur during the sampling interval, and wherein producing the set of test bits comprises repeatedly:

initializing the register at a beginning of a new sampling interval;

during the sampling interval, maintaining a value in the register that indicates a running count of a number of transitions that occur in the oscillating signal;

determining whether the sampling interval has expired; and when the sampling interval has expired, sampling the one or more values of the one or more bits from one or more bits of the register, and beginning a new sampling interval.

7. The method of claim 6, wherein the transitions that are included in the running count are selected from low-to-high transitions, high-to-low transitions, and both low-to-high and high-to-low transitions.

8. The method of claim 6, wherein the one or more bits include one or more of the least significant bits of the register.

9. The method of claim 1, further comprising:

prior to changing the current value of the sampling parameter, performing a pre-defined number of retry operations without changing the current value, wherein each retry operation includes again producing the set of test bits, again analyzing the set of test bits to determine the randomness measurement, and again determining whether the randomness measurement meets the criteria.

10. The method of claim 1, wherein:

producing the set of test bits includes storing at least some of the test bits as they are produced in a buffer; and after determining whether the randomness measurement meets the criterion, and when the randomness measurement meets the criterion, producing an indication to a random number generator that the test bits in the buffer may be used as an entropy bitstring by the random number generator.

11. A method for a bitstring generator to generate a bitstring, the method comprising the steps of:

setting a sampling parameter to a current value, wherein different values of the sampling parameter are associated with different probabilities of being able to correctly predict values of one or more bits produced by the bitstring generator, wherein the values are derived from a received signal;

repeatedly sampling the values of the one or more bits, wherein each sampling process is performed based on the current value of the sampling parameter, and wherein the repeated sampling results in a set of test bits;

analyzing the set of test bits to determine a randomness measurement associated with the set of test bits;

determining whether the randomness measurement meets a criterion;

when the randomness measurement does not meet the criteria, changing the current value of the sampling parameter to a different value that corresponds to a lower probability of being able to correctly predict the values of the one or more bits produced by the bitstring generator; and repeating the steps of repeatedly sampling, analyzing the set of test bits, and determining whether the randomness measurement meets the criteria.

12. The method of claim 11, wherein the sampling parameter is selected from a parameter that specifies an interval of time, a parameter that specifies a number of clock cycles, a parameter that specifies a number of clock signal transitions, a parameter that specifies a number of sampling bits, a parameter that specifies a voltage range, and a parameter that specifies a current adjustment.

13. The method of claim 11, wherein the received signal is an oscillating signal, and wherein the method further comprises the steps, performed before sampling the values of the one or more bits, of:

measuring a variable associated with the oscillating signal; and storing a measurement of the variable in a register, wherein the one or more bits whose values are sampled include one or more bits of the register.

14. The method of claim 13, wherein the oscillating signal is a square wave produced by an oscillator, and the oscillator is characterized by producing a signal having a value that becomes less predictable over time.

15. A system comprising:
a sampling parameter register configured to retain a current value of a sampling parameter;
a sampling parameter setting module configured to store the current value of the sampling parameter in the sampling parameter register;
a sampling control module configured to produce a set of test bits by repeatedly causing values of one or more bits to be sampled, wherein the values are derived from a received signal, and wherein the sampling control module causes each sampling process to be performed upon an expiration of a sampling interval that corresponds to the current value of the sampling parameter; and
a testing module configured to analyze the set of test bits to determine a randomness measurement associated with the set of test bits, and to determine whether the randomness measurement meets a criterion,
wherein the sampling parameter setting module is further configured to change the current value of the sampling parameter to a different value that corresponds to an increase in the sampling interval when the randomness measurement does not meet the criteria.

16. The system of claim 15, further comprising:
a measurement module configured to produce a measurement of a variable associated with an oscillating signal; and
a register coupled to the measurement module and to the sampling control module, wherein the register is configured to receive the measurement of the variable from the measurement module and to store the measurement of the variable, and wherein
the sampling control module is configured to produce the set of test bits by causing the one or more bits whose values are sampled to include one or more bits of the register.

17. The system of claim 15, further comprising:
an oscillator that is characterized by producing a signal having a value that becomes less predictable over time.

18. The system of claim 17, wherein the oscillator comprises a ring oscillator configured to produce a square wave.

19. The system of claim 15, further comprising:
a buffer configured to store at least some of the test bits as they are produced; and
a random number generator configured to receive an entropy bitstring, and
wherein the testing module is further configured to provide a signal to the random number generator when the randomness measurement meets the criteria, wherein the signal indicates to the random number generator that the test bits in the data structure may be used as the entropy bitstring.

20. The system of claim 19, wherein the random number generator is a deterministic random number generator.

* * * * *